(12) United States Patent
Dooley et al.

(10) Patent No.: US 6,477,174 B1
(45) Date of Patent: *Nov. 5, 2002

(54) POLLING RESPONSE SELECTION USING REQUEST MONITORING IN A NETWORK SWITCH APPARATUS

(75) Inventors: David Dooley, San Jose; David A. Hughes, Mountain View, both of CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/010,891

(22) Filed: Jan. 22, 1998

Related U.S. Application Data (63) Continuation-in-part of application No. 08/535,347, filed on Sep. 28, 1995, now Pat. No. 6,185,222.

(51) Int. Cl.[7] .............................................. H04L 12/42
(52) U.S. Cl. ..................................................... 370/416
(58) Field of Search .............................. 370/389, 401, 370/447, 449, 396, 461, 412, 414, 415, 416, 418, 410; 395/200.68, 471

(56) References Cited

U.S. PATENT DOCUMENTS

| | | | |
|---|---|---|---|
| 4,584,680 A | * | 4/1986 | Carter et al. ................ 370/360 |
| 4,623,996 A | | 11/1986 | McMillen .................... 370/60 |
| 4,630,258 A | * | 12/1986 | McMillen et al. ............ 370/60 |
| 4,774,705 A | | 9/1988 | Eaves, Jr. ..................... 370/58 |
| 5,126,999 A | | 6/1992 | Munter et al. |
| 5,130,975 A | | 7/1992 | Akata .......................... 370/60 |
| 5,148,428 A | | 9/1992 | Lee ............................. 370/60 |
| 5,179,552 A | * | 1/1993 | Chao ........................... 370/60 |
| 5,276,425 A | | 1/1994 | Swanson et al. ............. 340/826 |
| 5,422,880 A | * | 6/1995 | Heitkamp et al. ........... 370/352 |
| 5,440,523 A | | 8/1995 | Joffe ....................... 365/230.05 |
| 5,506,841 A | | 4/1996 | Sandquist ................... 370/60.1 |
| 5,517,495 A | * | 5/1996 | Lund et al. .................. 370/399 |
| 5,544,160 A | | 8/1996 | Cloonan et al. |
| 5,553,266 A | * | 9/1996 | Metzger et al. .............. 395/471 |
| 5,592,472 A | * | 1/1997 | Grant et al. ................. 370/351 |
| 5,724,349 A | * | 3/1998 | Cloonan et al. ............. 370/390 |
| 5,970,232 A | * | 10/1999 | Passint et al. ......... 395/200.68 |
| 6,185,222 B1 | * | 2/2001 | Hughes ....................... 370/414 |

OTHER PUBLICATIONS

Tony T. Lee, "A Modular Architecture For Very Large Packet Switches", *Conference Record Globecom*, vol. 3, pp. 1801–1809, (1989).

Soung C. Liew and Kevin W. Lu, "A 3–Stage Interconnection Structure For Very Large Packet Switches", *Conference Record Supercom ICC*, vol. 2, pp. 316.7.1–316.7.7 (1990).

(List continued on next page.)

*Primary Examiner*—Chau Nguyen
*Assistant Examiner*—Alexander O. Boakye
(74) *Attorney, Agent, or Firm*—Blakely, Sokoloff, Taylor & Zafman LLP (57) ABSTRACT

A switch node includes arbiter logic configured to gather global information regarding switching requests within the switch node and to control switching of one or more packets through the switch node. The arbiter logic may include a bus snooping interface configured to detect the switching requests within the switch node. The bus snooping interface includes a plurality of switching request destination registers configured to store switching request destination information from the detected switching requests. In addition, the arbiter logic includes a packet switching request array configured to transmit a next switching request within the switch node according to prior switching request destination information stored in the switching request destination registers. The switching of the one or more packets may be through a cross-point switch matrix in the switch node.

15 Claims, 10 Drawing Sheets

OTHER PUBLICATIONS

Hiroshi Suzuki, Hiroshi Nagano and Toshio Suzuki, "Output–buffer Switch Architecture For Asynchronous Transfer Mode", *Conference Record IEEE*, pp. 99–103 (1989).

Achille Pattavina, "Multichannel Bandwidth Allocation in a Broadband Packet Switch", *IEEE Journal Select, Areas Commun.*, vol.6, No. 9, pp. 1489–1499 (12/88).

Michael G. Hluchyj and Mark J. Karol, "Queueing in High–Performance Packet Switching", *IEEE Journal Select. Areas Commun.*, vol. 6, No. 9, pp. 1587–1597 (12/88).

Joseph Y. Hui and Edward Arthurs, "A Broadband Packet Switch for Integrated Transport", *IEEE Journal Select. Areas Commun.*, vol. 5, No. 8, pp. 1264–1273 (10/87).

Mark J. Karol et al., "Input Versus Output Queueing on a Space–Division Packet Switch", *IEEE Transations Commun.*, vol. 35, No. 12, pp. 1347–1356 (12/87).

Yuji Oie et al., "Effect of Speedup in Nonblocking Packet Switch", *Conference Record ICC*, vol. 1, pp. 410–414 (1989).

Yu–Shuan Yeh, Michael G. Hluchyj and Anthony S. Acampora, "The Knockout Switch: A Simple, Modular Architecture for High–Performance Packet Switching", *IEEE Journal Select. Areas Commun.*, vol.5, No. 8, pp. 1274–1283 (10/87).

Soung C. Liew and Kevin W. Lu, "Comparison of Buffering Strategies for Asymmetric Packet Switch Modules", *IEEE Journal Select. Areas Commun.*, vol. 9, No. 3, pp. 428–438 (Apr. 1991).

Joan Garcia–Haro and Andrzej Jaszczyk, "ATM Shared–Memory Switching Architectures", *IEEE Network*, pp. 18–26 (Jul./Aug. 1994).

Kai Y. Eng. et al., "A Growable Packet (ATM) Switch Architecture: Design Principles and Applications", *IEEE Transactions Commun.*, vol. 40, No. 2, pp. 423–430 (2/92).

Mark J. Karol and Chih–Lin I, "Performance Analysis of a Growable Architecture for Broad–Band Packet (ATM) Switching", *IEEE Transactions Commun.*, vol. 40, No. 2, pp. 431–439 (2/92).

Hideki Tode, Miki Yamanoto and Hiromi Okada, "Shared Output Buffer–Type Switching Architecture with Fair Output Port Contention", *Electronics & Communications in Japan*, vol. 77, No. 5, pp. 62–76 (5/94).

Rixue Fan et al., "Expandable ATOM Switch Architecture (XATOM) for ATM LANs", *Supercomm/ICC*, vol. 1, IEEE, pp. 402–409 (5/94).

P.C. Wong and M.S. Yeung, "Dynamic Priority Schemes For Fast Packet Switches", *Proceedings of the International Conference Communications*, vol. 1, IEEE pp. 538–544 (6/95).

Yukihir Doi and Naoaki Yamanaka, "A High–speed ATM Switch Architecture for FTTH", *ISS*, vol. 1, pp. 384–388 (4/95).

H. Yamanaka et al., "622 Mb/ 8×8 Shared Multibuffer ATM Switch with Hierarchical Queueing and Multicast Functions" pp. 1488–1495 (1993).

* cited by examiner

POLLING RESPONSE SELECTION USING REQUEST MONITORING IN A NETWORK SWITCH APPARATUS

RELATED APPLICATIONS

This application is a continuation-in-part and claims priority to patent application Ser. No. 08/535,347, entitled "An Asymmetric Switch Architecture For Use In A Network Switch Node," filed Sep. 28, 1995, now U.S. Pat. No. 6,185,222 to David A. Hughes and assigned to the assignee of the present invention, the entire disclosure of which is incorporated herein by reference.

FIELD OF THE INVENTION

The present invention relates generally to network switches and, more particularly, to an polling mechanism for use in a network switch having a number of interfaces.

BACKGROUND

Asynchronous Transfer Mode (ATM) or "cell switching" is a method of transmitting digital information wherein the information is broken into equal sized units called "cells." The individual cells of information are transmitted from a source node to a destination node through a "connection". A connection is a pathway through a digital network. A digital network is constructed of digital switch nodes coupled together by digital communication links. "Packet" switching is a similar technology, however, in packet switching networks, variable length packets (instead of fixed length cells) are transmitted between nodes.

Each cell or packet originates at a source node and is transmitted across the communication links. The communication links carry the cells or packets of information between the digital switch nodes along the connection pathway. The digital switch nodes route the cells or packets from incoming communication links to outgoing communication links and finally to a destination node. Each digital switch node can be connected to several communication links, each of which may carry several different connections simultaneously.

Thus, packet-switched and cell-switched networks use switch nodes to provide a shared transmission path for a multiplicity of ports, thereby reducing the overall cost and complexity of the ports and the network. A port may be coupled to a communication link such as an OC3 line for communicating to another switch node. Alternatively, a port may be coupled to an endpoint of a network such as customer premise equipment (CPEs).

Figure 1:
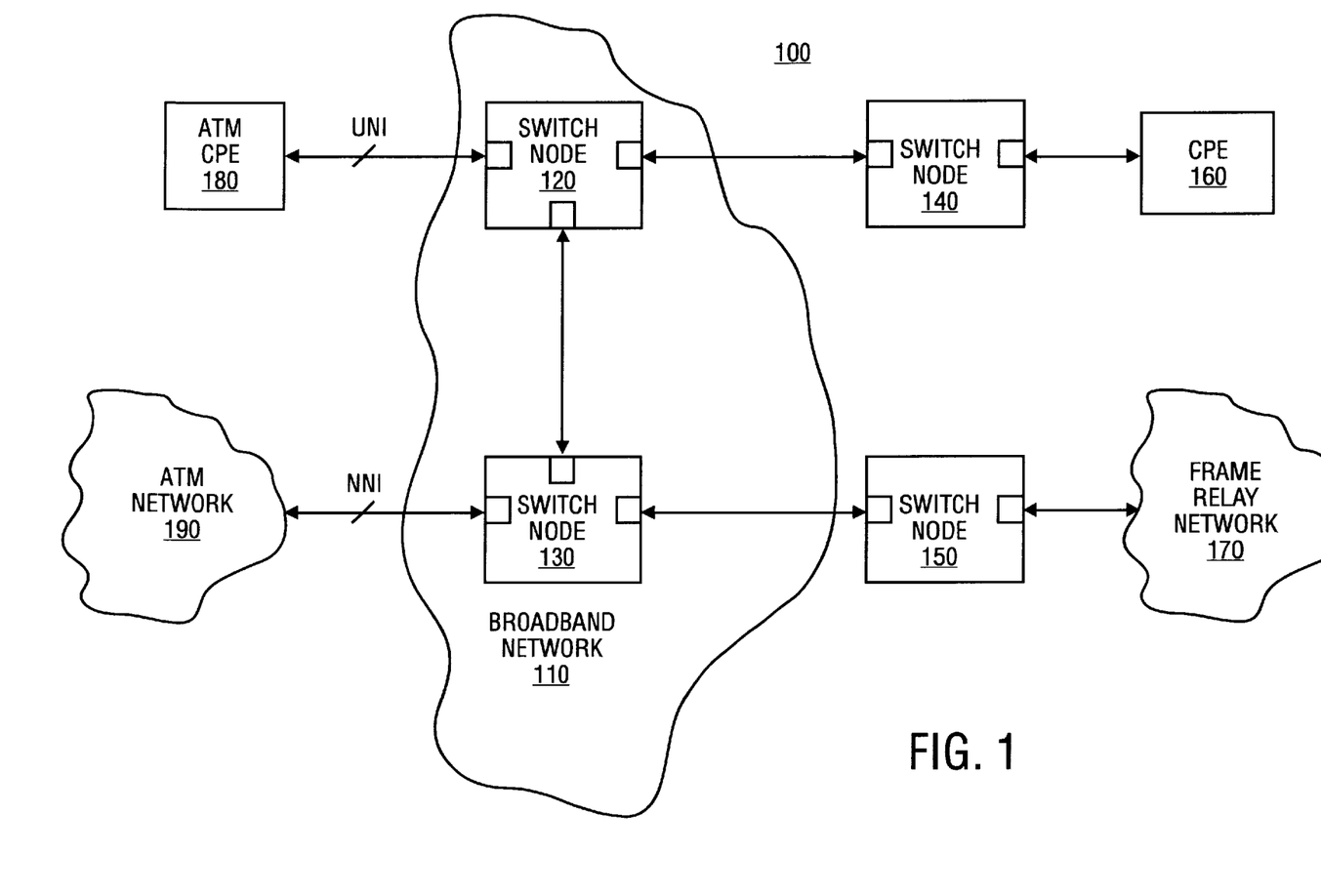
FIG. 1 shows an exemplary digital communications network.

FIG. 1 illustrates such an exemplary digital communications network 100. The network 100 illustrated in FIG. 1 is a cell-switched digital communication network, however, the same principles apply for a packet-switched digital communication network. The digital network 100 is constructed of digital switch nodes that are capable of building virtual circuits for routing cells. Switch nodes 120 and 130 serve as the backbone for a broadband digital Wide Area Network (WAN) 110. Switch nodes 140 and 150 couple smaller narrowband digital communication links to the broadband digital network.

Each digital switch node 120 and 130 is coupled to one or more broadband digital communication links (e.g., E3 lines, T3 lines, OC3 lines, OC12 lines, etc.). The digital switch nodes 120 and 130 are also coupled to digital switch nodes 140 and 150 using broadband digital communication links.

Each digital switch node 140 and 150 in FIG. 1 is used to couple slower digital communication links to the broadband digital communication network 10. The slower communication links may couple various CPE 160 and/or other networks (e.g., frame relay network 170) to these switches. The CPE 160 may consist of any type of digital communication equipment such a Private Branch Exchange (PBX) or a packet router.

Each digital switch 120 and 130 includes one or more port modules. The port modules in each digital switch 120 and 130 can be used to directly connect a digital switch (e.g., digital switch 120) to any customer premise equipment (CPE) 180 that uses asynchronous transfer mode (ATM) communications and supports the proper interface. Such a connection comprises a user to network interface (UNI). The port modules may also support an interface which allows the digital switches 120 and 130 to be connected together (or to other networks, e.g., ATM network 190) via one or more high speed digital communication links. Where a connection is made to another network, the interface comprises a network to network interface (NNI).

Figure 2:
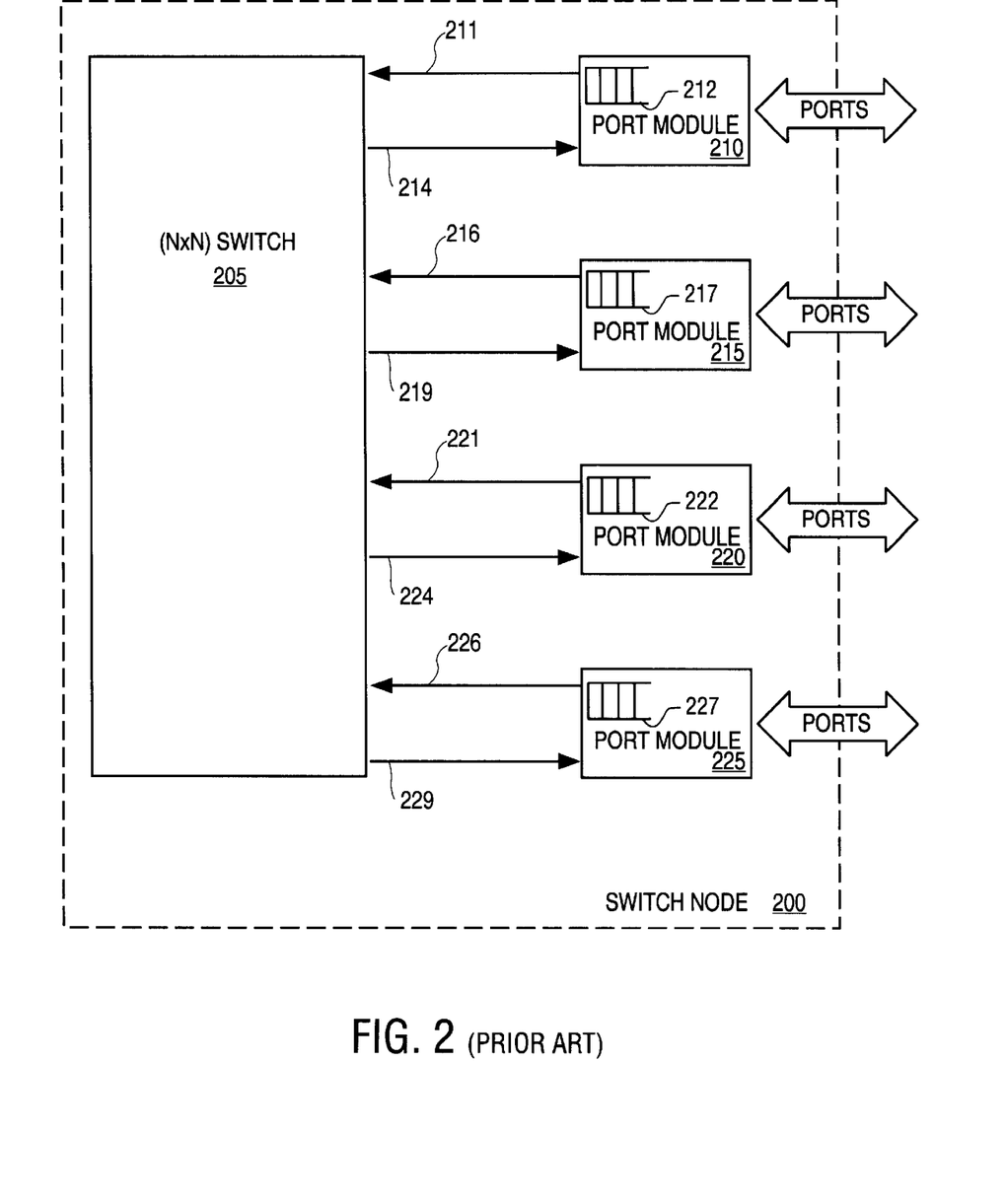
FIG. 2 shows a prior switch node that uses input buffering for preventing loss of blocked packets for use in the digital communication network of FIG. 1.

FIG. 2 shows a prior switch node 200 (which may resemble switch nodes 120 and/or 130, etc. of FIG. 1) in more detail. Switch node 200 comprises switch module 205 and port modules 210, 215, 220 and 225. Switch module 205 functionally operates as an N×N switching fabric having N inputs and N outputs. Therefore, for the example of N=4, switch module 205 is connected to port module 210 via input line 211 and output line 214, to port module 215 via input line 216 and output line 219, to port module 220 via input line 221 and output line 224, and to port module 225 via input line 226 and output line 229.

Port modules 210, 215, 220 and 225 use switch module 205 as a common interconnect for switching data packets (e.g., cells) between one another. The throughput of a switch module output is limited to the throughput of an output line, which typically results in only one packet being switched per output per transaction or "connection" cycle of switch module 200. Therefore, output or "port" contention arises when multiple port modules attempt to simultaneously transmit packets to the same destination port. Because only one packet may be switched to the destination port per connection cycle, the other packets are "blocked," and data loss can occur.

Packet buffering is typically performed to prevent the loss of blocked packets. For example, each of the port modules of switch node 200 includes input buffers to prevent packet loss due to contention for the same destination port module. Input buffers 212, 217, 222 and 227 are shown as first in first out buffers (FIFOs) and store all packets that are to be switched in a first-in-first-out manner, regardless of their destination port. Switch node 200 is said to use "input buffering" because packets are buffered by the port modules before they enter the switching fabric of switch module 205.

Input buffering allows switch module 205 to operate at the input line speed, which reduces the complexity and cost of switch module 205; however, the throughput of the switch node 200 may be significantly reduced if port contention occurs. When a packet or cell at the head of a FIFO must wait for transmission, all subsequent packets in the FIFO must also wait even though their destination ports may be available during the present connection cycle. This phenomenon is called "head-of-line blocking."

Figure 3:
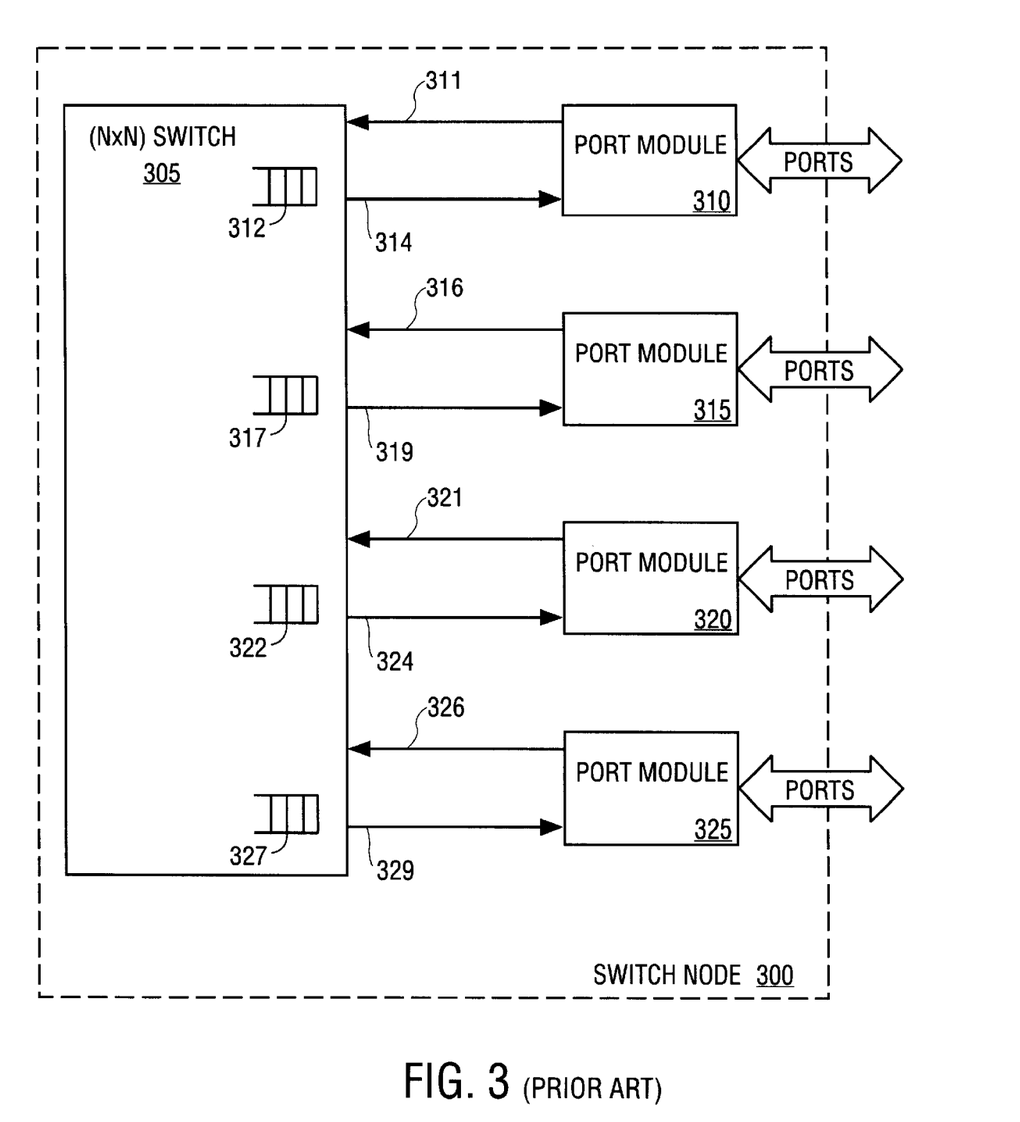
FIG. 3 shows a prior switch node that uses output buffering for preventing loss of blocked packets for use in the digital communication network of FIG. 1.

An alternative switch node architecture uses output buffering to provide improved performance relative to input buffered switch nodes. FIG. 3 shows a prior switch node 300 that uses output buffering and comprises switch module 305 and port modules 310, 315, 320 and 325. Switch module 305 functionally operates as an N×N switch matrix. Therefore, for the example of N=4, switch module 305 is connected to port module 310 via input line 311 and output line 314, to port module 315 via input line 316 and output line 319, to port module 320 via input line 321 and output line 324, and to port module 325 via input line 326 and output line 329. To guard against data loss due to output contention, switch module 305 includes output buffers 312, 317, 322 and 327 associated with each of the port modules. Output buffers 312, 317, 322 and 327 are shown as FIFOs, but they may be implemented using a shared memory architecture.

Output buffering eliminates the head-of-line blocking effect of input buffered switch nodes. The primary drawback of an output buffered switch node is that the switch module (e.g., switch module 305) must be operated N times faster than the input line speed, which significantly increases the complexity and cost of the switch module when compared to switch modules of an input buffered switch node. For example, output buffering according to conventional schemes typically requires that output buffers be placed on the switch module because each output line only allows one packet to be passed to a port module per connection cycle wherein up to N–1 packets may be received for transfer per connection cycle. The output buffers must operate at the speed of the switch module, and memory costs are therefore significantly increased when compared to the memory costs for input buffering schemes.

SUMMARY OF THE INVENTION

In one embodiment, the present invention provides a switch node having arbiter logic configured to gather global information regarding switching requests within the switch node and to control switching of one or more packets through the switch node. The arbiter logic may include a bus snooping interface configured to detect the switching requests within the switch node. The bus snooping interface includes a plurality of switching request destination registers configured to store switching request destination information from the detected switching requests. In addition, the arbiter logic includes a packet switching request array configured to transmit a next switching request within the switch node according to prior switching request destination information stored in the switching request destination registers. The switching of the one or more packets may be through a cross-point switch matrix in the switch node.

In a further embodiment, the present invention involves polling a first of a plurality of port modules of a switch node for a switching request; and transmitting the switching request from the first port module, the switching request being for a destination port module selected according to global information regarding previous switching requests of one or more of the plurality of port modules. The switching request from the first port module may be granted if the destination port module has an available channel to accept a packet associated with the switching request from the first port module. In one embodiment, transmitting the switching request from the first port module may be accomplished by selecting a first of a plurality of enqueued switching requests if the global information regarding previous switching requests indicates that a channel of a destination port module associated with the first enqueued switching request is available to accept a packet associated with the first enqueued switching request, otherwise selecting another of the plurality of enqueued switching requests.

In yet a further embodiment of the present invention, switching requests of a plurality of port modules are monitored for a first of the plurality of port modules. Then, a first destination port module is selected if the monitored switching requests indicate that a maximum number of output channels for the first destination port module have not already been requested, otherwise a next destination port module is selected. The monitoring may be performed at the first port module.

In another embodiment of the present invention, a switch node includes an arbiter coupled to a plurality of input buffers and further coupled to a plurality of destination port modules via a polling bus. The arbiter is configured to detect switching transactions made by the destination port modules and to selectively transmit a packet stored in one of the input buffers to one of the destination port modules having an unrequested channel, as determined according to the detected switching transactions.

In still a further embodiment, the present invention provides an arbiter coupled to a plurality of input buffers and a polling bus. The arbiter is configured to monitor switching activity by a plurality of port modules coupled to the polling bus to determine which of the port modules have at least one available transmission channel through an asymmetric switch module. The arbiter is further configured to send a packet to the asymmetric switch module from one of the input buffers only if a destination port module of the packet has at least one available transmission channel.

Other features and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

In accordance with one embodiment of the present invention, a switch node architecture having an asymmetric switching fabric and a polling bus is provided. The asymmetric switching fabric has N inputs and M outputs, wherein M>N and, preferably, M=kN. Each port module of the switch node may be coupled to one input and k outputs of the switching fabric such that k source port modules may simultaneously transmit to the same destination port module without buffering. The asymmetric switch-to-port interface results in less contention and less blocking and further allows for output buffering wherein the output buffers are placed in the port modules rather than in the switch module. Each port module monitors the switching requests of every other port by monitoring the polling bus using associated arbiter logic. For example, if the arbiter logic of a first port module requests to send a packet to a second port module, arbiter logic within each of the other port modules detects the request. If the arbiter logic of a given port module determines that the maximum number of output channels for a first destination port module have already been requested, the arbiter logic may delay any pending requests for that first destination port module and request that a packet be delivered to a second port module. In this manner, port modules of the switch node may avoid contention by detecting when all output lines of a destination port module are in use and request to switch a packet having a destination port module with at least one available output channel.

A number of terms will be used consistently throughout the following discussion. For example, a switch module will be referred to simply as a "switch," and the interface between a port module and a switch module will be referred to as a "switch-to-port interface". Furthermore, because cells are fixed length packets, the term "packet" will be used to refer to both cells and packets. The consistent use of these terms is intended to simplify discussion and should not be construed as limiting the manner in which the present invention may be practiced.

Figure 4:
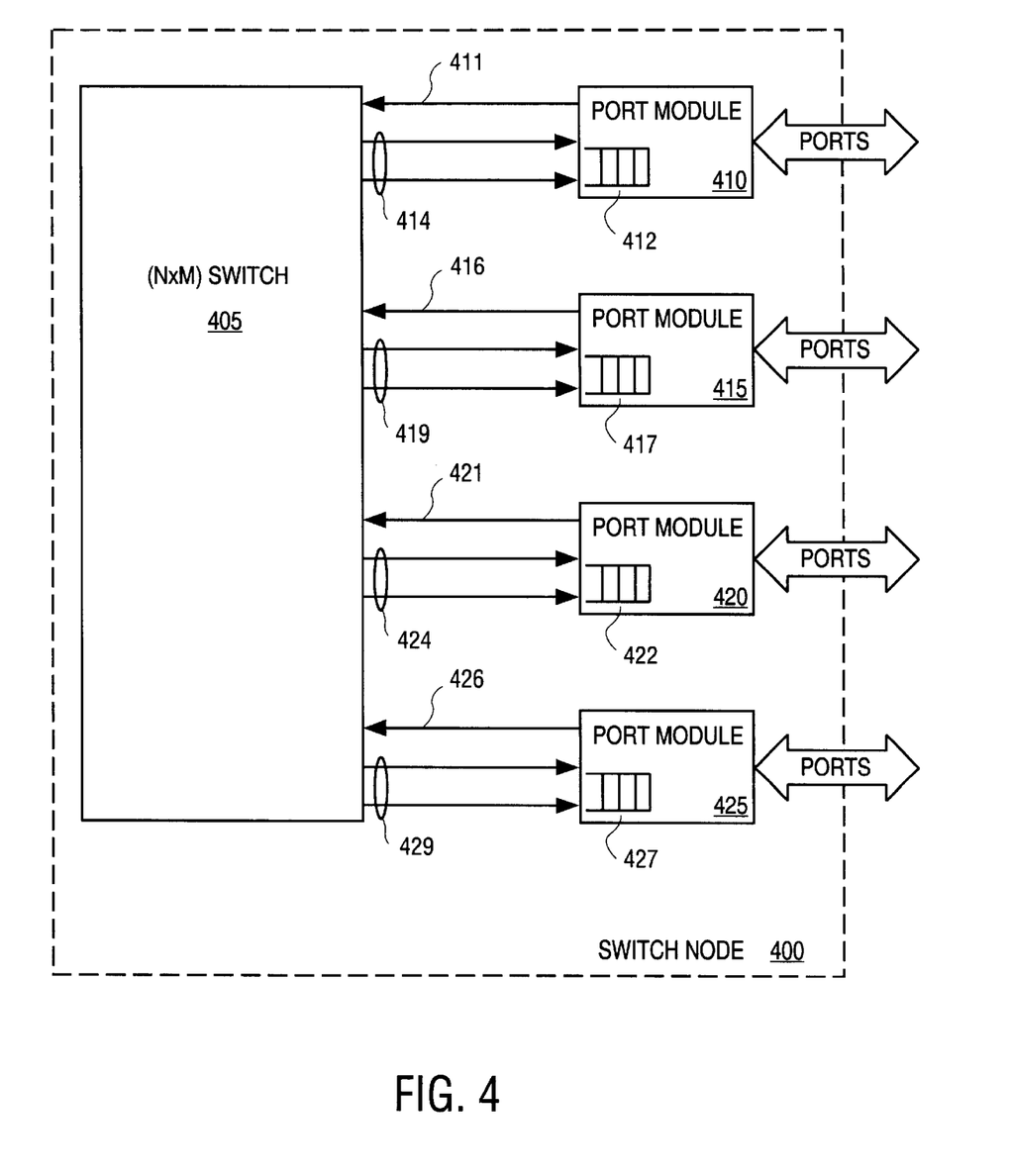
FIG. 4 shows a switch node that includes an asymmetric switch architecture for use according to one embodiment of the present invention.

FIG. 4 shows a switch node 400 that includes an asymmetric N×M switch 405 having N inputs and M outputs wherein N may be any arbitrary number, and M>N. According to the present embodiment, M=kN, wherein N=4 and k=2. The number k may be any arbitrary number and is not necessarily an integer.

N×M switch 405 is shown as being coupled to each of port modules 410, 415, 420 and 425 via one input line and k output lines (k=2 for the illustrated embodiment) wherein the input and output lines may be implemented as a backplane bus. Specifically, port module 410 is coupled to switch 405 via input line 411 and two output lines 414, port module 415 is coupled to switch 405 via input line 416 and two output lines 419, port module 420 is coupled to switch 405 via input line 421 and two output lines 424, and port module 425 is coupled to switch 405 via input line 426 and two output lines 429. Each port module 410, 415, 420 and 425 is coupled to a multiplicity of ports wherein the combined bandwidth or data rates of the ports may exceed the bandwidth of the input lines 411, 416, 421 and 426.

It is not required that every port module 410, 415, 420 and 425 be provided with an asymmetric interface to switch 405. For example, port modules 410 and 415 may each be coupled to three output lines when port modules 420 and 425 are coupled to only one output line. Furthermore, if the output lines coupled between the switch 405 and the port modules 410, 415, 420 and 425 have a greater throughput than the input lines—e.g. if the throughput of an output line equals k times the throughput of an input line—the number of output lines that are physically provided may be equal to the number of input lines.

In practice, switch node 400 may be implemented in a chassis that includes a backplane bus having multiple expansion slots. A switch module that includes N×M switch 405 and at least one port module that requires a single set of switch input/output lines (to be coupled to the backplane bus) and includes a multiplicity of port interfaces may be placed in the expansion slots. Other equivalent implementations may be used.

Providing multiple output lines or "channels" from the switch to a port module allows multiple packets to be switched simultaneously to the same port module. This, in turn, allows the output buffers to be moved from the switch to the port modules thereby reducing the memory costs typically associated with output buffering. Therefore, port module 410 is shown as including output buffer 412, port module 415 is shown as including output buffer 417, port module 420 is shown as including output buffer 422, and port module 425 is shown as including output buffer 427. Each of the output buffers 412, 417, 422, and 427 is shown as a first in first out (FIFO) buffer and each may be implemented in any one of many alternative arrangements.

The asymmetric switch-to-port interfaces of switch node 400 reduce blocking due to port contention when compared to switch nodes that use symmetric switch-to-port interfaces. Port contention may be completely eliminated if $M=N(N-1)$. For large switching fabrics setting $M=N(N-1)$ is impractical because of the added cost and complexity of switch 405. Switch 405 may be designed to further reduce port contention when $M<N(N-1)$.

Figure 5:
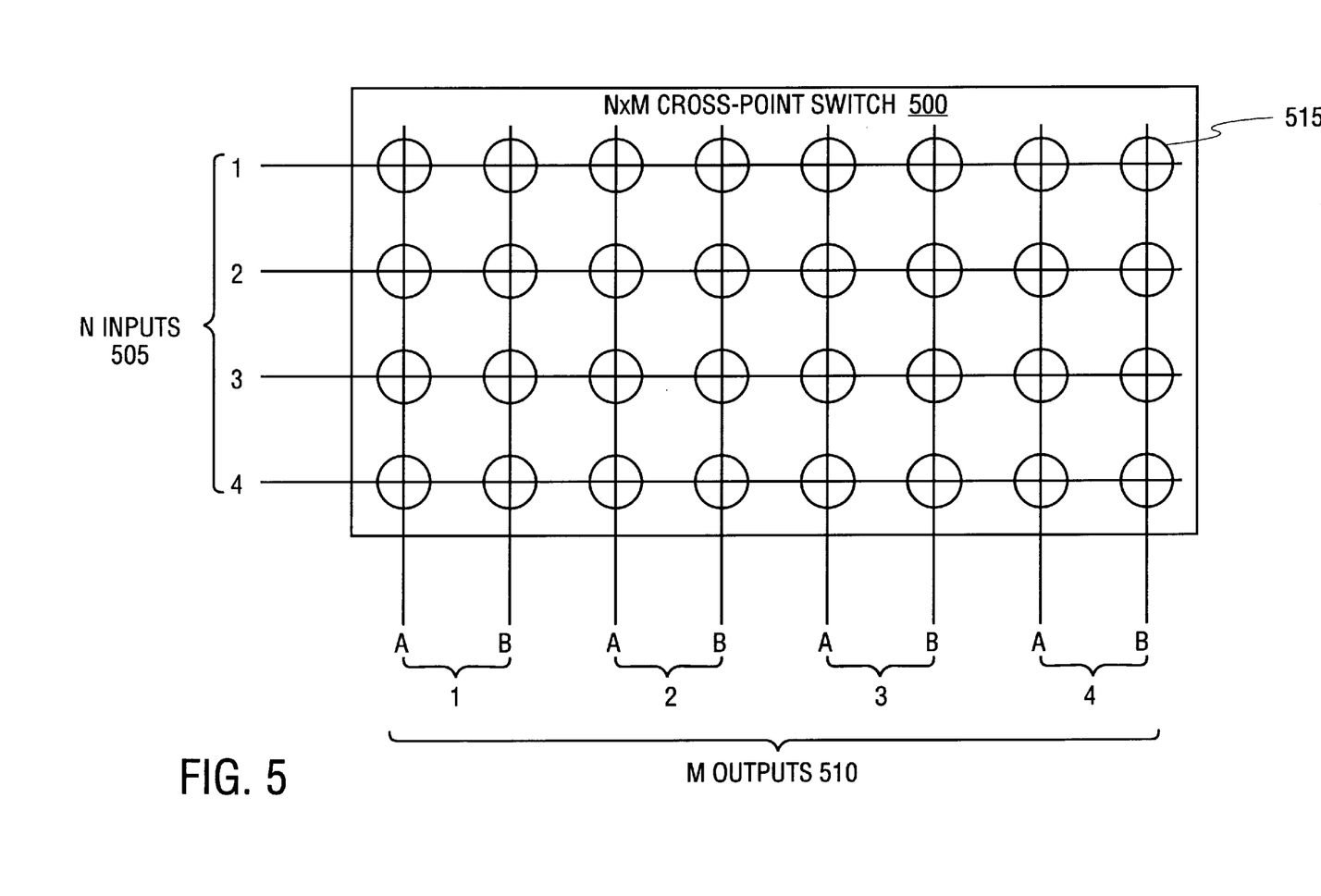
FIG. 5 shows an asymmetric cross-point switching fabric for use according to one embodiment of the present invention.

One type of switching fabric is the cross-point switch, and FIG. 5 shows an asymmetric N×M cross-point switch 500 for use according to one embodiment of the present invention. Cross-point switch 500 includes N inputs 505, M outputs 510, and N×M switch elements 515 wherein inputs 505 are shown as horizontal lines, outputs 510 are shown as vertical lines, and switch elements 515 are shown as circles at the intersections between the horizontal and vertical lines. FIG. 5 continues the example where M=kN and k=2. Cross-point switch 500 may alternatively be provided by designing an appropriate bus architecture.

Cross-point switch 500 can provide multiple paths to a single destination port module. Indeed, each of the outputs 510 of cross-point switch 500 is provided as one of k channels or paths to each port module and each of the port modules 1–4 are therefore shown as being provided with an A channel and a B channel. Although cross-point switch 500 can simultaneously provide multiple output paths or channels to the same destination port module, port contention can still occur when $k<N-1$. For example, if three port modules request access to the same destination port module at any given time, contention will occur.

Figure 6:
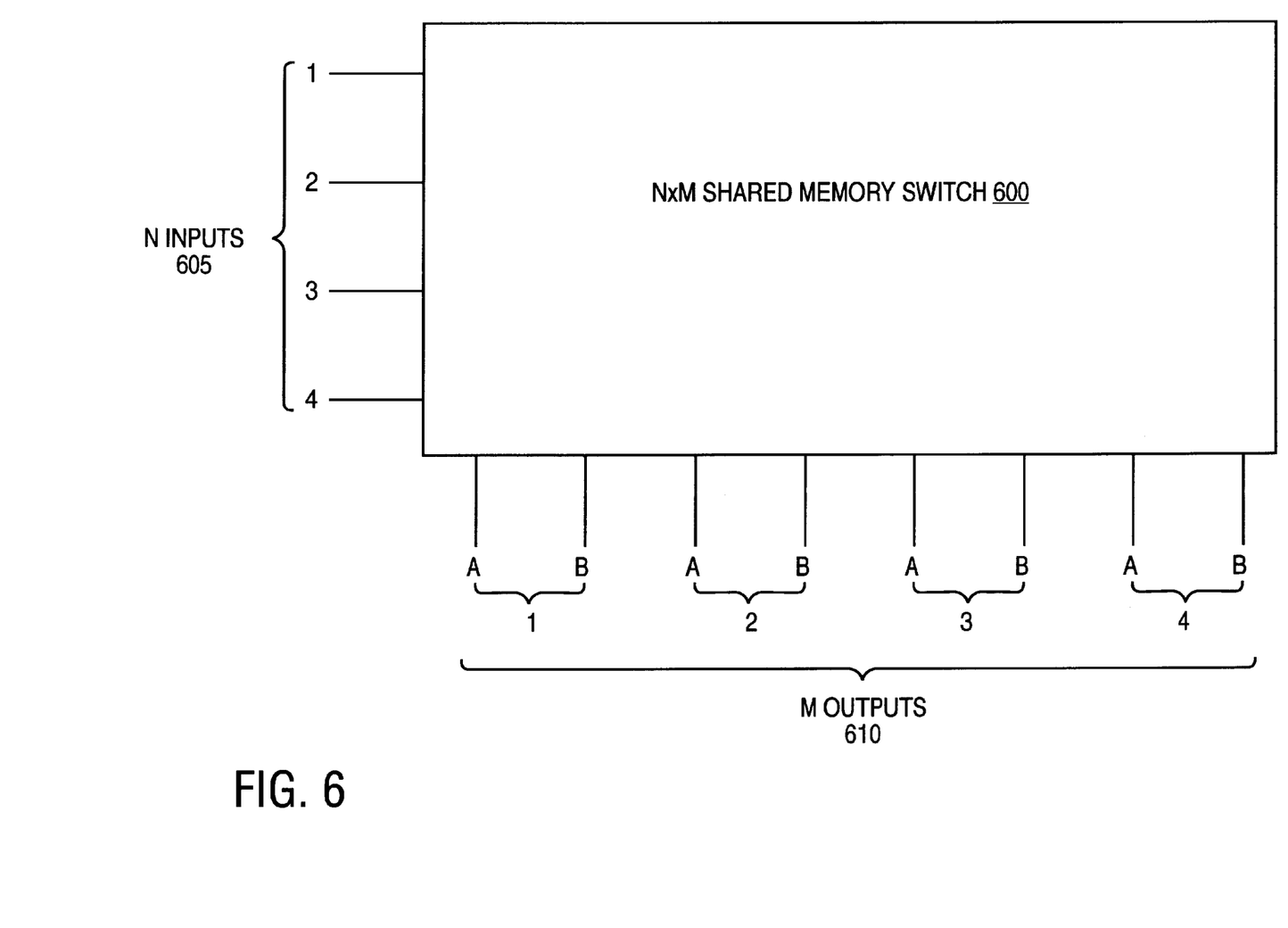
FIG. 6 shows an asymmetric shared memory switching fabric for use according to one embodiment of the present invention.

FIG. 6 shows an alternative switching fabric wherein switch 405 comprises an N×M shared memory switching fabric 600 having N inputs 605 and M outputs 610. Shared memory switching architectures are known in the art and may be readily modified to be asymmetric. Other known switching architectures may also be modified to be asymmetric Shared memory switching fabrics are known to provide generally superior performance to cross-point switching fabrics. Unfortunately, shared memory switching fabrics tend to be much more complex and much more expensive than cross-point switching fabrics. Modifications to cross-point switching fabrics can provide similar performance to shared memory switching fabrics.

Figure 7:
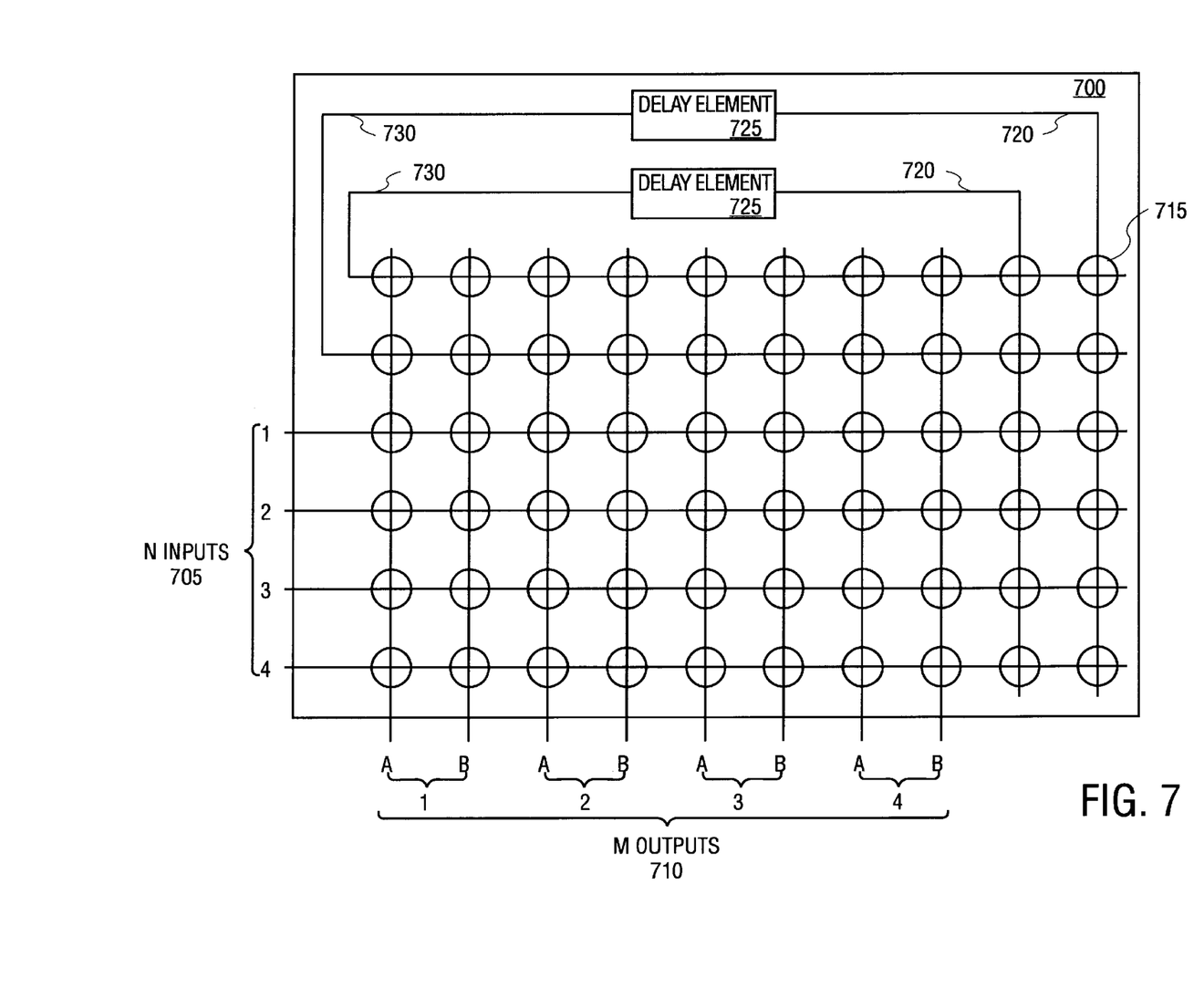
FIG. 7 shows an asymmetric cross-point switching fabric that further includes loopback memory for reducing blocking for use according to one embodiment of the present invention.

For example, FIG. 7 shows an asymmetric cross-point switch 700 that uses delay loops or "loopback memory" to reduce blocking due to excessive port contention. Only two delay loops are used for the embodiment of FIG. 7, but additional delay loops may be provided to increase the overall throughput of the switch. Like cross-point switch 500, cross-point switch 700 includes N inputs 705 and M outputs 710 wherein the outputs 710 are provided as channel pairs to each of the port modules. Cross-point switch 700 is additionally provided with two delay loops each comprising a delay input 720, a delay element 725, and a delay output 730. The delay inputs 720 are shown as vertical lines and are provided as alternative "outputs" to those connected to the port modules. Similarly, delay outputs 730 are shown as horizontal lines and are provided as alternative "inputs" to those connected to the port modules. Additional switch elements 715 are required to provide connectivity to the delay loops, and the total number of switch elements 715 is equal to $((N \times M)+L(N+M+L))$, wherein L is equal to the number of delay loops.

Each delay element 725 provides one connection cycle of delay. If no channels of a particular port module are available during a given connection cycle, the signal at the input destined for that port module is routed through a delay loop, and the output of the delay loop may be provided to a channel of that port module in the next connection cycle. If no channel is available the next cycle, the signal may continue to be delayed until an output channel is available.

Figure 8:
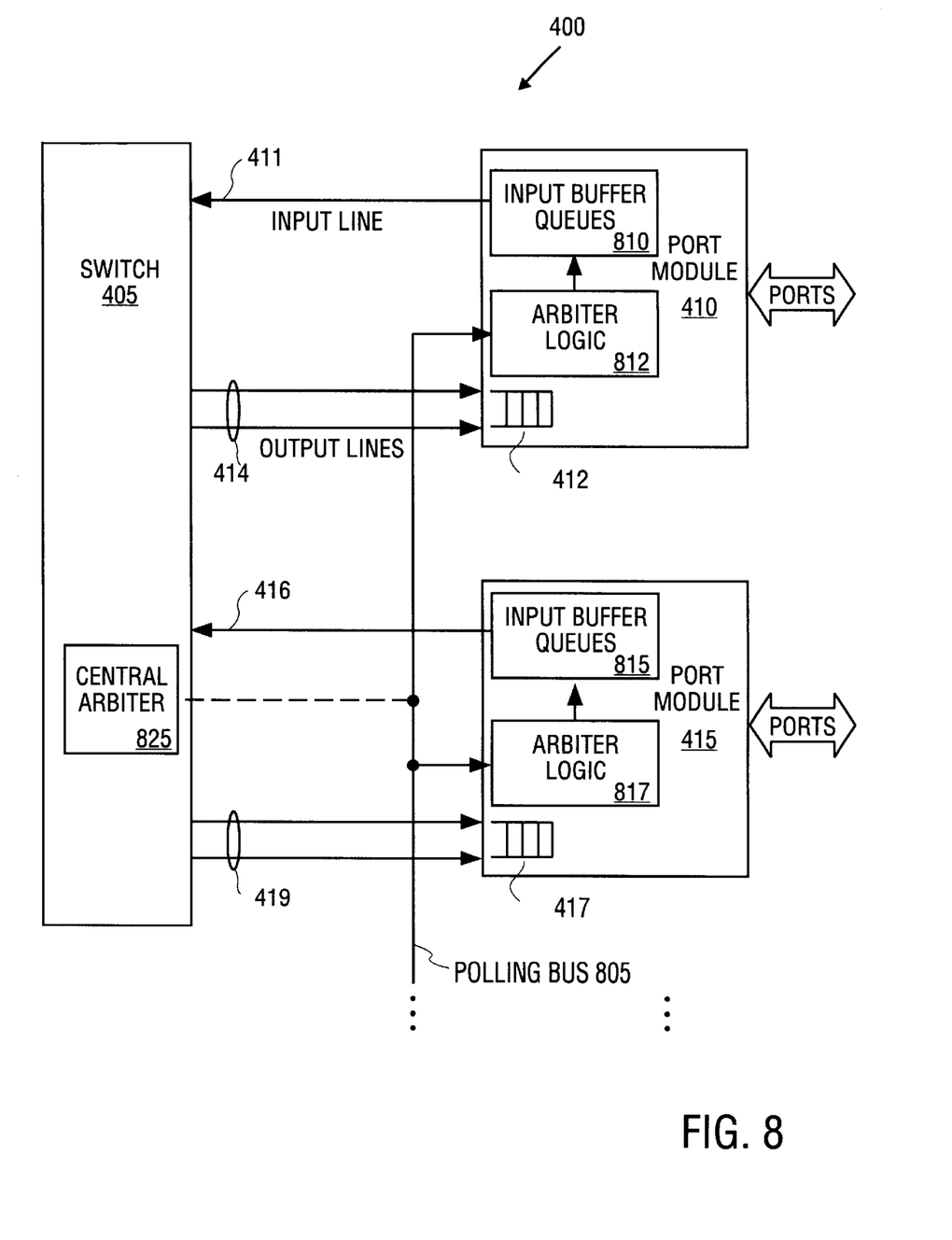
FIG. 8 shows a switch node that includes an asymmetric cross-point switching fabric and a polling bus for use according to one embodiment of the present invention.

In accordance with the present invention, an arbitration scheme is provided to manage access to the switch by the port modules. FIG. 8 shows the use of a polling bus 805 for reducing contention of the cross-point switching fabric. Each of the port modules 410, 415, 420 and 425 are provided with destination port module-specific input buffer queues. For a switch node having N port modules, N–1 input buffer queues are provided for each port module. For example, port module 410 includes input buffer queues 810 wherein there are separate queues for buffering received packets destined for port modules 415, 420 and 425. Similarly, port module 415 includes input buffer queues 815 wherein there are separate queues for packets: destined for port modules 410, 420 and 425. Ports 420 and 425 are also provided with input buffer queues. For some circumstances, it may be desirable to provide N buffer queues for each port module (e.g., to accomodate loopback where the source port module is also the destination port module).

Each port module monitors the switching requests of every other port module by monitoring polling bus 805 using associated arbiter logic. For example, if arbiter logic 812 of port module 410 requests to send a packet to port module 420, arbiter logic 817 of port 415 detects the request. If the arbiter logic of a given port module determines that the maximum number of output channels for a given port module have already been requested (e.g., two channels for the illustrated embodiment), the arbiter logic may delay any pending requests for that port module and request that a packet from another of the input buffer queues 810 be delivered to a different port module. In this manner, port modules of the switch node may avoid contention by detecting when all channels of a destination port module are in use and may request to switch a packet to a destination port module with at least one output channel available.

A central arbiter 825 may be coupled to the polling bus, and the required functionality of the arbitration logic located on the port modules may thereby be reduced. Within a single polling cycle, the central arbiter 825 (which may be associated with the switch module as illustrated or which may be a separate card within the chassis of the switch node) will poll each of the port modules 410, 415, 420 and 425, preferably in a pseudo-random order. A switching request generated by a port module in response to a poll is sent via the shared polling bus 805. These switching requests contain a destination port module identifier. In some embodiments, separate poll and request busses may be used. In those cases, the snooping operations which are described below take place over the request bus—i.e., each port module snoops the requests transmitted by other port modules on the request bus to determine whether a desired switching request will be blocked or available. For clarity, the remaining discussion assumes that the polling bus 805 transports polls and requests and the present invention contemplates situations where this may be accomplished using the same line(s) (used in a time multiplexed fashion, for example) or separate lines.

Because there is a physical limitation on the number of inputs a destination port module can handle (e.g., two in the case of the illustrated embodiment) in a given packet transfer window to follow a polling cycle, the probability of the arbiter 825 issuing a grant to a polled port module is subject to switching requests issued by other port modules that were polled earlier in the current polling cycle. For example, if three of the polling modules all request to have connections established to the fourth polling module, only the first two switching requests will be issued grants. Without the use of the arbiter logic associated with each of the port modules, such a sit uation would result in a wasted cell transfer window for the third polling module which does not receive a grant. However, the use of the arbiter logic associated with each of the port modules reduces the likelihood of this occurrence because the requesting port module can track which destinations the port modules polled previously in the current polling cycle have requested. Thus, a currently polled port module can choose a switching request associated with a destination port module that has an available channel, i.e., a destination port module that has not already received its maximum number of switching requests for a given packet transfer window.

Because the switching requests generated by each port module are sent over the shared polling bus 805, each port module 410, 415, 420 and 425 can snoop the switching requests sent by the other port modules and then, when it is polled, use this collected global information regarding switching requests in switch node 400 to generate the response (i.e., the switching request) that will be most likely to receive a grant from the central arbiter 825. This reduces the amount of blocking that would occur if the responses were always generated based on the destination of the "head-of-queue" packet stored in the input buffer queues of the port module. This capability of the port modules may be referred to as a "look-ahead" function and will be further described with reference to FIG. 10.

Figure 9:
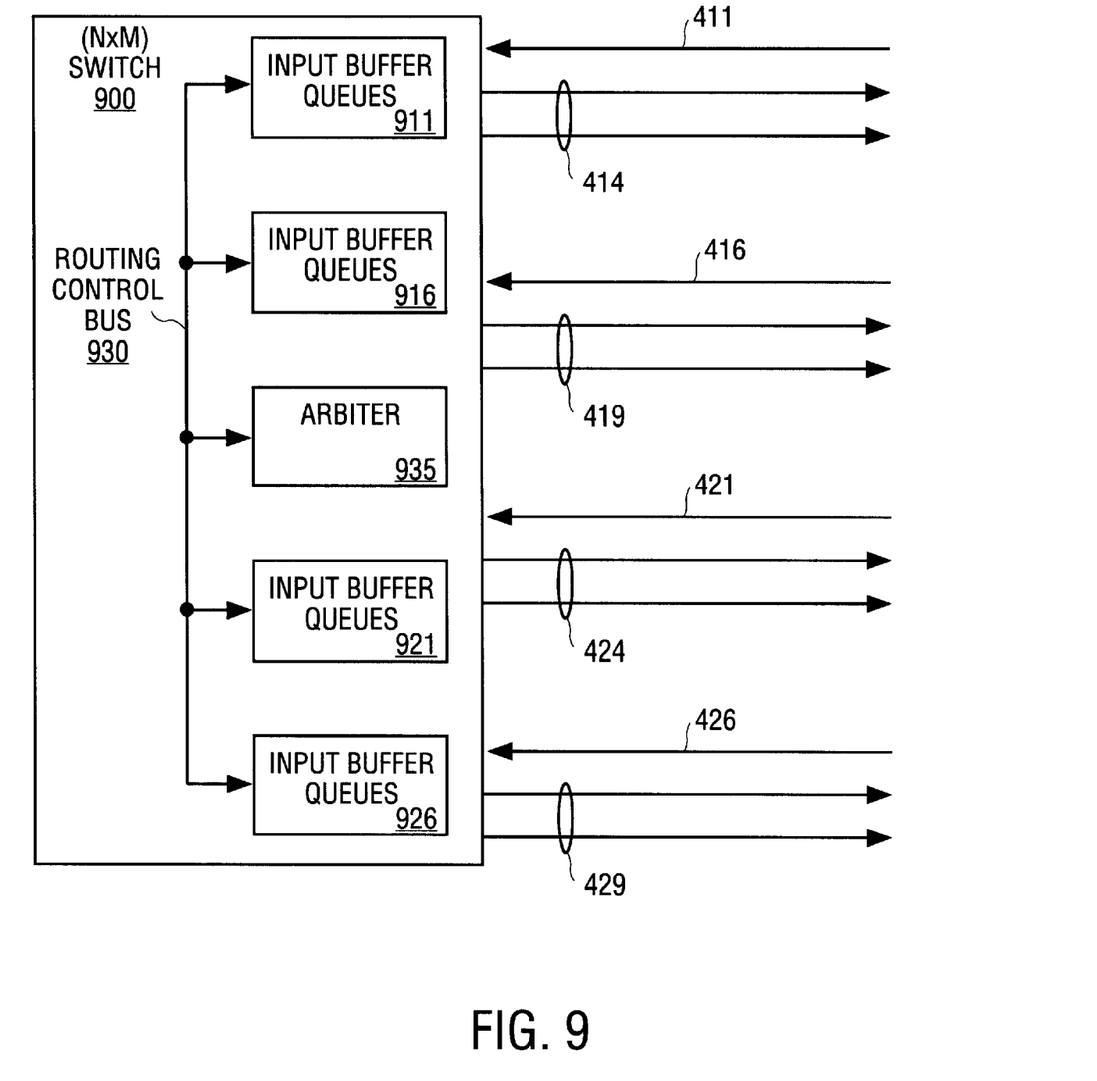
FIG. 9 shows an asymmetric cross-point switching fabric that further includes an arbiter having global knowledge of switching requests within a switch node for use according to one embodiment of the present invention.

Before describing the look-ahead function in detail, however, reference is briefly made to FIG. 9 which shows another possible implementation for reducing port contention in a cross-point switching fabric. For this example, input buffer queues are provided at the switch rather than at the port modules. Thus, switch 900 is shown as including input buffer queues 911, 916, 921 and 926 coupled to input lines 411, 416, 421 and 426, respectively. An arbiter 935 is coupled to a routing control bus 930 to detect activity in each of input buffer queues 911, 916, 921 and 926. In this manner, arbiter 935 is provided with global knowledge of routing activity within the switch node and arbiter 935 may implement simple routing algorithms to route packets through the cross-point switch 900. For example, arbiter 935 may implement variations of the look-ahead function referred to above.

Figure 10:
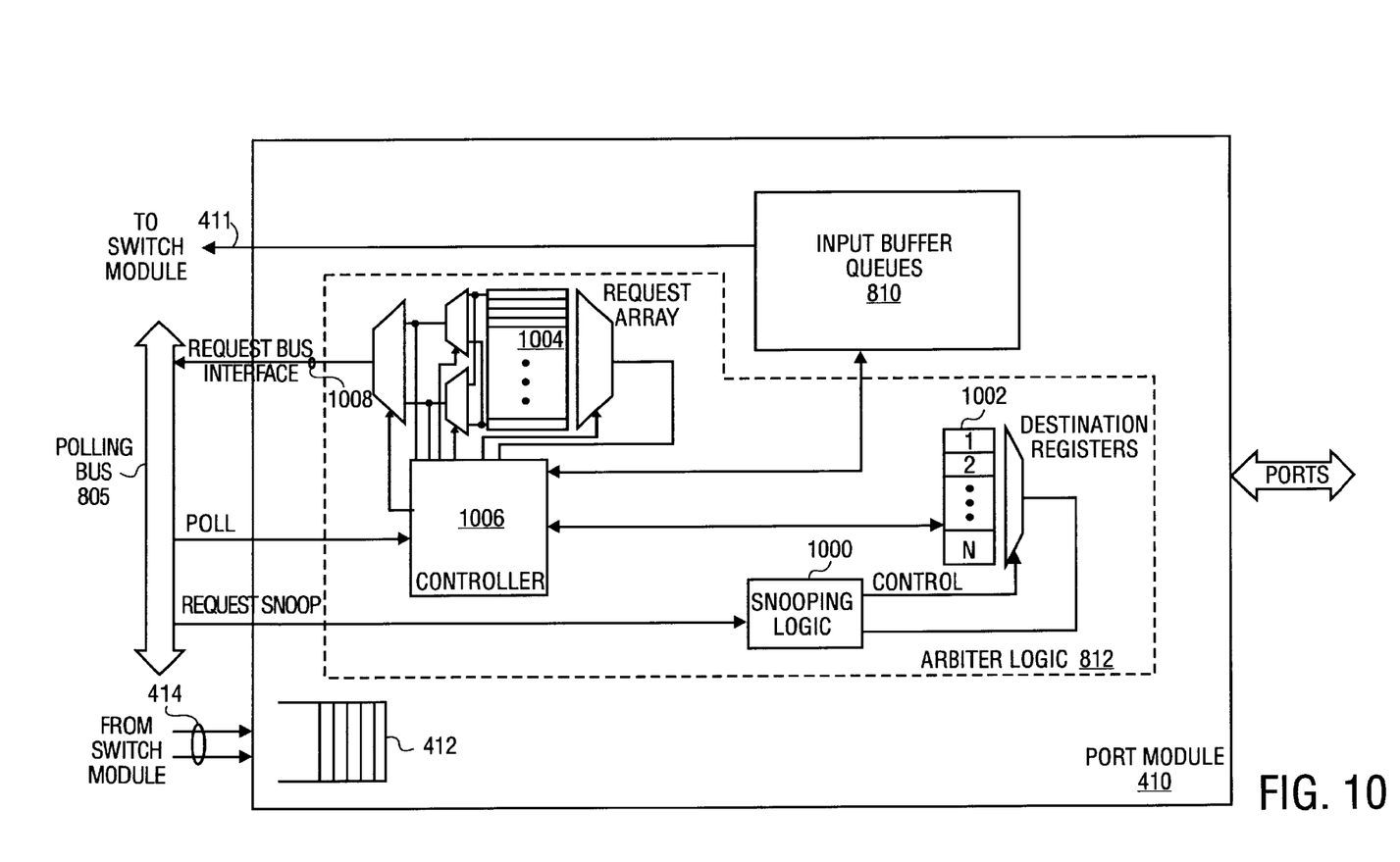
FIG. 10 shows arbiter logic configured to gather global knowledge of switching requests within a switch node for use according to one embodiment of the present invention.

FIG. 10 illustrates arbiter logic 812 for port module 410 in further detail. It should be appreciated that arbiter logic for the other port modules may be substantially similar in design. Further, the arbiter 935 for use according to the embodiment illustrated in FIG. 9 may implement some or all of the features of arbiter logic 812 for each input buffer queue 911, 916, 921 and 926. Thus, although shown as being part of port module 410, arbiter logic 812 may have a number of other applications.

Arbiter logic 812 is configured to implement the look-ahead function, thus allowing for an "intelligent" choice to be made in selecting the switching request to be transmitted to the central arbiter 825 by the port module 410. Arbiter logic 812 may search through a number of switching request entries (each associated with a packet stored in input buffer queue 810) in a queue for a switching request bound for a different destination port module than the "head-of-queue" entry in cases where the head-of-queue entry is likely to be blocked. Secondary requests found by the arbiter logic 812 can be presented to the central arbiter 825 in place of the head-of-queue request.

In other words, arbiter logic 812 is configured to gather global knowledge of switching requests within the switch node. Arbiter logic 812 further allows port module 410 to present a switching request that will have a high probability of being granted by arbiter 825 during a polling cycle on polling bus 805. Polling cycles are initiated by arbiter 825 and during each polling cycle, each port module is queried as to the destination port module for a packet to be transmitted. In response to a poll, each of the port modules provides arbiter 825 with the identification of a destination port module. If the requested switching transaction can be accommodated by the switch 405 (i.e., if the destination port module associated with the switching:request has an available channel to accept a packet associated with the switching request), the arbiter 825 provides the requesting port module with a grant. After each of the port modules has been polled, those switching requests which were granted are allowed to take place (i.e., the packets are routed from their respective source port module queues to the destination port modules. Polling of the port! modules may be carried out in any appropriate fashion, such as round robin or pseudo-random order.

To allow arbiter logic 812 to gather global information regarding switching requests within the switch node arbiter logic 812 is provided with a bus snooping interface coupled to polling bus 805. The bus snooping interface is configured to detect the switching requests within the switch node. The bus snooping interface includes snooping logic 1000 and switching request destination registers 1002. The switching request destination registers 1002 are configured to store switching request destination information from the detected switching requests. In particular, the switching request destination registers 1002 store indications regarding the destination port modules for previous switching requests of other port modules which were made during a current polling cycle.

Arbiter logic 812 also includes a packet switching request array 1004 configured to transmit a next switching request within the switch node according to prior switching request destination information stored in the switching request destination registers 1002. In operation, switching requests are transmitted from packet switching request array 1004 under the control of controller 1006 and in response to a poll received from polling bus 805. When controller 1006 receives a poll, controller 1006 causes a selected one of the switching requests stored in packet switching request register 1004 to be transmitted.

In response to a switching request from port module 410, central arbiter 825 may grant the switching request if the destination port module associated with the switching request has an available channel to accept the packet associated with the switching request. Because each port module monitors the switching requests of every other port module by monitoring the polling bus 805 using associated arbiter logic, the port modules may avoid contention by detecting when all output lines of a particular destination port module are in use and request to switch a packet having a destination port module with at least one available output channel. This tends to ensure that switching requests which are transmitted will be granted. The ultimate switching of the packets may be through a cross-point switch matrix in the switch node.

From the above it is apparent that switching packets in accordance with the present invention involves first, polling a first of a number of port modules of a switch node for a switching request. Second, the switching request is transmitted from the first port module. The switching request is for a destination port module selected according to global information regarding previous switching requests of one or more of the port modules. The switching request from the first port module may be granted if the destination port module has an available channel to accept a packet associated with the switching request from the first port module. Transmitting the switching request from the first port module is accomplished by selecting a first of a number of enqueued switching requests if the global information regarding previous switching requests indicates that a channel of a destination port module associated with the first enqueued switching request is available to accept a packet associated with the first enqueued switching request. Otherwise another of the plurality of enqueued switching requests is selected.

Packet switching request array 1004 comprises a "bubble-up" structure wherein the head-of-queue entry in the array is used as a primary request. When port module 410 is polled, the destination identifiers from the switching request destination registers 1002 are compared against the destination identifiers of the head-of-queue entry in the packet switching request array 1004. The switching request nearest the head-of-queue entry that is to a different destination port module than the primary request is initially selected as the secondary request. Based on the global information gathered via snooping the polling bus 805 during the active polling cycle, it may be desirable to select a new secondary request if port module 410 has not yet been polled and it is known that the secondary request initially selected will be blocked. Note that there may be situations, primarily when the packet switching request array 1004 contains few entries, in which there may be no secondary request available. In such cases, the primary request may be presented in response to a poll, even if it is known that the request is likely to be blocked.

By default, the head-of-queue entry in the packet switching request array 1004 is selected to be presented on the request bus interface 1008 to the polling bus 805. The secondary request will only be selected if two conditions are true. First, that a valid request to a destination port module different than the one pointed to by the primary request is found before the port module 410 has been polled within the current polling cycle. Second, that at least two requests (in the illustrated exemplary system) to the same destination port module as the head-of-queue entry have already been made (by other port modules) within the current polling cycle. The second condition is determined by examining the destination identifiers from the switching request destination registers 1002.

The switching request destination registers 1002 are used to collect global information gathered from snooping the polling bus 805. The switching request destination registers 1002 are configured to store destination identifiers from the switching requests transmitted by other port modules. The switching request destination registers 1002 are cleared between each polling cycle to allow new destination identifiers associated with switching requests transmitted during the next polling cycle to be stored. The switching request destination registers 1002 may be implemented as a pair of registers, one for the primary request and the other for the secondary request. In such cases, as switching requests made by other port modules are snooped, appropriate entries may be made in the primary switching request destination registers. Entries in the secondary switching request destination registers are made when a switching request to a particular destination port module already having an entry in the primary switching request destination registers is snooped. Such an implementation can be expanded to systems where k>2.

From the above, it is apparent that if an implementation similar to that shown in FIG. 9:is desired, the arbiter 935 may be coupled to the input buffer queues 911, 916, 921 and 926 via a polling bus (e.g., as part of routing control bus 930). Arbiter 935 would be configured to detect switching transactions to destination port buffer and to selectively transmit a packet stored in one of the input buffer queues to one of the destination port modules having an unrequested channel, as determined according to the detected switching transactions.

One other aspect of the present invention is worthy of note. From the above it should be apparent that the look-ahead function provided by arbiter logic 812 allows packets to be transmitted out-of-order. That is, packets other than those at the head of a queue may be transmitted between a source port module and a destination port module. However, in accommodating these out-of-order transmissions, packet sequence integrity should be preserved. In other words, a source port module may store multiple cells that are all bound for a common channel. These packets should not be transmitted out-of-order with respect to one another, otherwise packet sequence integrity will be lost. Thus, the look ahead function provided by arbiter logic 812 preserves packet sequence integrity when allowing the out-of-order transmission of packets.

In general, an arbiter may be coupled to a plurality of input buffers and a polling bus and may be configured to monitor switching activity by a plurality of port modules coupled to the polling bus to determine which of the port modules has at least one available transmission channel through a switch module. The arbiter may be further configured to send a packet to the asymmetric switch module from one of the input buffers only if a destination port module of the packet has at least one available transmission channel. These and other embodiments of the present invention may be realized in accordance with the above teachings and it should be evident that various modifications and changes may be made to the above described embodiments without departing from the broader spirit and scope of the invention. The specification and drawings are, accordingly, to be regarded in an illustrative rather than restrictive sense and the invention measured only in terms of the claims which follow.

What is claimed is:

1. A switch node comprising:
   arbiter logic to gather global information regarding switching requests within the switch node and to control switching of one or more packets through the switch node using the gathered global information, the arbiter logic includes:
      a bus snooping interface to detect the switching requests within the switch node, the bus snooping interface including a plurality of switching request destination registers to store switching request destination information from the detected switching requests.

2. A switch node as in claim 1 wherein the arbiter logic further comprises a packet switching request array that transmits a next switching request within the switch node according to prior switching request destination information stored in the switching request destination registers.

3. A switch node as in claim 1 wherein the switching of the one or more packets is through a cross-point switch matrix in the switch node.

4. A switch node, comprising;
   a plurality of port modules that each send packets to a switch and receive packets from the switch; and
   a first port module of the plurality of port modules, the first port module further comprising a plurality of input buffers and an arbiter, the arbiter;
      a) being coupled to the plurality of input buffers, each input buffer of the plurality input buffers to hold a packet prior to its being sent from the first port module through the switch to one of the plurality of port modules other than the first port module, wherein, packets destined to different port modules are held in different input buffers;
      b) being coupled to a bus, the bus being coupled to each of the plurality of port modules other than the first port module;
      c) to detect from the bus which of the plurality of port modules other than the first port module is a destination port module for one or more packets waiting to be sent to the switch;
      d) to delay transmission of a request to send a packet held in one of the input buffers, if, the arbiter determines that the particular port module to which the held packet is to be sent will be unable to receive it.

5. An arbiter that interfaces to a plurality of input buffers and a bus, the plurality of input buffers and the arbiter being part of a port module that sends packets to an asymmetric switch module and receives packets from the asymmetric switch module, the arbiter comprising:
   1) means for monitoring the bus for requests made to the asymmetric switch module, each monitored request being a request to send a packet through the asymmetric switch module to any of a plurality of other port modules, wherein, each port module amongst the plurality of other port modules is also coupled to the bus; and
   2) means for:
      a) determining which of the plurality of port modules have at least one available transmission channel through the asymmetric switch module; and
      b) for allowing a request for a packet to be sent to the asymmetric switch module from only one of the input buffers if a port module, from amongst the plurality of port modules, that corresponds to a destination port module of the packet has at least one available transmission channel to receive the packet from the asymmetric switch module.

6. A switch node comprising:

a first means for gathering global information regarding switching requests within the switch node and to control switching of one or more packets through the switch node using the gathered global information, said first means further comprising a second means for snooping a bus in order to detect the switching requests within the switch node, the second means including a plurality of switching request destination registers to store switching request destination information from the detected switching requests.

7. A switch node as in claim 6, the first means further comprising a third means for transmitting a next switching request within the switch node according to prior switching request destination information stored in the switching request destination registers.

8. A switch node as in claim 6, further comprising a fourth means for switching the one or more packets through a cross-point switch matrix in the switch node.

9. A port module that sends packets to a switch module and that receives packets from the switch module, the port module further comprising an arbiter, the arbiter further comprising:

a) snooping logic that interfaces to a bus in order to snoop requests that ask to send a packet to another port module;

b) destination register space that keeps track of which of the other port modules are available to receive a packet;

c) a packet switch request array that holds requests to be issued on the bus to the switch module by the port module for those packets being held by the port module that are waiting to be sent to the switch module.

10. The port module of claim 9 wherein the arbiter also has an input that receives a poll from a central arbiter within the switch module.

11. The port module of claim 10 wherein the arbiter forwards one of the requests held by the packet switch request array in response to reception of a poll from the central arbiter, wherein, the forwarded request identifies one of the other port modules as the destination port module for the packet that the request was sent to the switch module on behalf of, wherein, prior to the forwarding of the request, the arbiter referred to the destination register space so as to recognize that the destination port module was available to receive a packet.

12. The port module of claim 9 wherein the port module further comprises a plurality of input buffers that hold the packets waiting to be sent to the switch module.

13. The port module of claim 12 wherein the plurality of input buffers are organized in a manner wherein those packets amongst the packets waiting to be sent to the switch module that are destined to be sent to different port modules are held within different input buffers.

14. The port module of claim 13 wherein the indication is made with a specific position within the packet switch array, the packet switch array configured to bubble younger requests toward said position after an older request has been issued by the arbiter.

15. The port module of claim 9 wherein the packet switch request array indicates which packet, amongst the packets that are waiting to be sent to the switch module, has waited the longest amount of time to be sent to the switch module.

* * * * *